June 24, 1958　　H. B. VROOM　　2,840,312
RECORDER

Filed March 10, 1953　　　　5 Sheets-Sheet 1

INVENTOR.
HAROLD B. VROOM
BY
Lindsey and Prutzman
ATTORNEYS

June 24, 1958  H. B. VROOM  2,840,312
RECORDER
Filed March 10, 1953  5 Sheets-Sheet 2

INVENTOR.
HAROLD B. VROOM
BY
Lindsey and Prutzman
ATTORNEYS

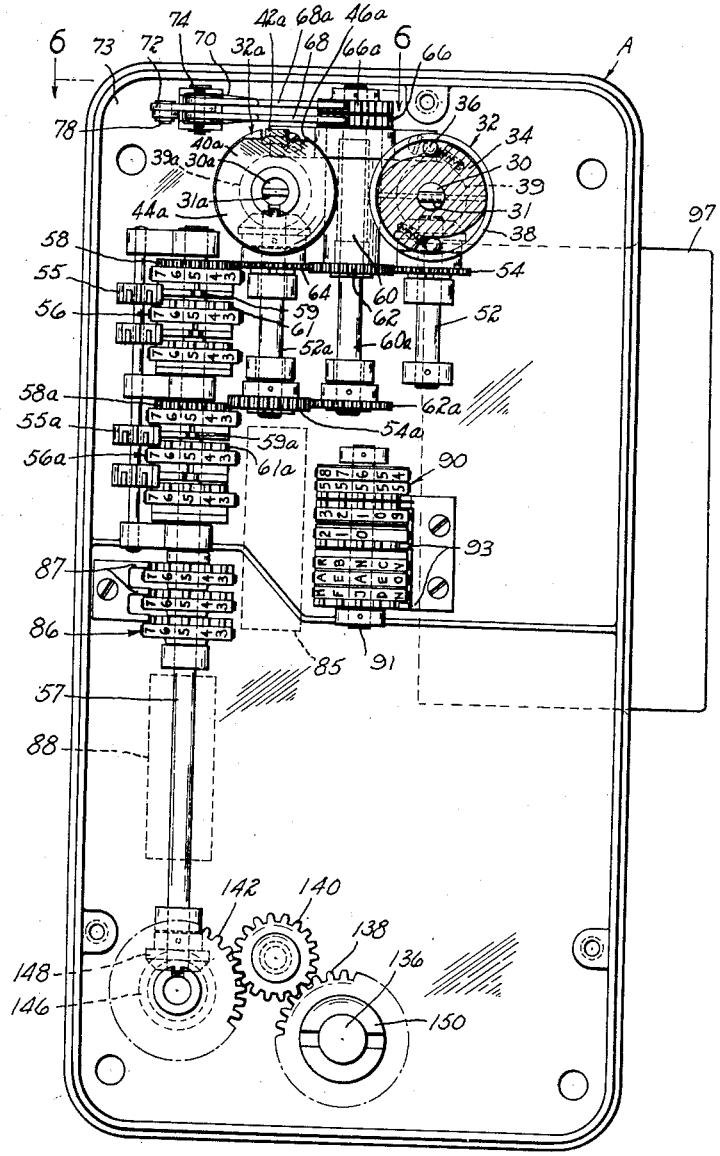

June 24, 1958

H. B. VROOM 2,840,312

RECORDER

Filed March 10, 1953

INVENTOR.
HAROLD B. VROOM

BY
Lindsey and Prutzman

ATTORNEYS

June 24, 1958 H. B. VROOM 2,840,312
RECORDER

Filed March 10, 1953 5 Sheets-Sheet 5

INVENTOR.
HAROLD B. VROOM
BY
Lindsey and Prutzman
ATTORNEYS

United States Patent Office 2,840,312
Patented June 24, 1958

2,840,312
RECORDER

Harold B. Vroom, Simsbury, Conn., assignor to Veeder-Root Incorporated, Hartford, Conn., a corporation of Connecticut Application March 10, 1953, Serial No. 341,456

25 Claims. (Cl. 235—94)

This invention relates in general to recording apparatus, and pertains more particularly to a device adapted to be connected to a dispensing apparatus or other mechanism whose operation is to be recorded so as to permit the obtaining of a printed record or receipt corresponding to the total number of units counted.

As an illustration, my device will find especial utility in connection with gasoline dispensing apparatus, for it will provide a facile means of printing sales slips which may be used for billing purposes where credit transactions are involved or receipts where the particular amount is paid for in cash. In fact, the system contemplated for use with the preferred embodiment of the present invention is an amplification of the well-known "Charga-Plate" plan now in widespread use in department stores, the instant system differing therefrom mainly in that all necessary information is automatically obtained and recorded on a sales slip without resort to longhand entries.

One object of the invention is to provide a recording device having numeral printing wheels which can be driven by an associated apparatus during operation thereof and which will thus automatically be conditioned for printing the number of units counted at the completion of the operation. In the case of use with gasoline dispensing apparatus the device may include separate sets of printing wheels for recording the volume and cost, respectively, of the gasoline dispensed.

It is a further object of the invention to provide a recorder which is particularly adapted for use with gasoline dispensing apparatus so that for simplicity of installation and use, it may be operated directly from and in conjunction with a standard computer of such dispensing apparatus and may be directly correlated with the visible register thereof, thus assuring the customer who can view the visible register that a reliable and accurate total has been recorded.

Not only is it an object of the invention to provide a recording device of the above-mentioned type which will be reliable and accurate in printing statements corresponding to the totals visibly registered, but the invention has for a further object the specific aim of printing the amounts to the nearest whole digit even though the dispensing operation is terminated at a time when the last digits of the cost or amount dispensed are in a state of transition. In this regard, it is an aim to provide for advancing the count to record the next highest unit only when at least a half unit has been counted, thereby obviating any criticism of overcharging, but, on the other hand, eliminating undercharging when, in fact, it is proper that the next highest full figure should be recorded and charged. Stated succinctly, the invention contemplates a recording device that will be fair to both the customer and the dealer.

Another object of the invention, which follows directly from the above object, is to assure that the printing of the cost and quantity, or either of them, will always occur in such a way that fragmentary portions of the printing type will never be recorded. In other words, the invention forestalls any printing operation during a transfer period from one order wheel to the next highest, or while the lowest order wheel is changing in value from one digit to the digit just above. Thus, the printing device forming the subject matter of this invention will always print a total that is full, complete and easily read, since there is no possibility that any of the printing wheels will be improperly aligned at the time the printing takes place.

Another object of the invention is to obtain a proper alignment of the printing wheels preparatory to effecting an actual printing operation without having this operation disturb or be affected by the connection with the associated mechanism to which the recorder is applied, thereby permitting a permanent connection to be utilized and eliminating any requirement for the operator to clutch or declutch the recorder at any time. This is particularly important in connection with dispensing apparatus where it is desirable to operate the recorder from the register and any discrepancy between the registered and recorded totals would be readily apparent. In this connection, it is still another object to provide for a resetting of the printing wheels concomitantly with the resetting of the indicating wheels forming part of the register mechanism, thus insuring that the recorder and register will be conditioned together for a subsequent dispensing operation and requiring only a single manipulative operation, such as is now used, to reset the register alone.

Another object is to provide a recorder which is adapted for use universally with a wide variety of dispensing apparatus so that it can be conveniently mounted and connected in a simple manner in all cases and will be pleasing in appearance.

A further object is to provide a recorder which is of simple and economical structure having a minimum of parts, which is of rugged construction so as to withstand adverse conditions, which is simple to operate, and which will stand up under hard usage.

Other objects will be in part obvious, and in part pointed out more in detail hereinafter.

The invention accordingly consists in the features of construction, combination of elements and arrangement of parts which will be exemplified in the construction hereafter set forth and the scope of the application of which will be indicated in the appended claims.

In the drawings:

Fig. 5 is a view taken in the direction of line 5—5 of Fig. 10 with the rear wall removed;

Figure 1:
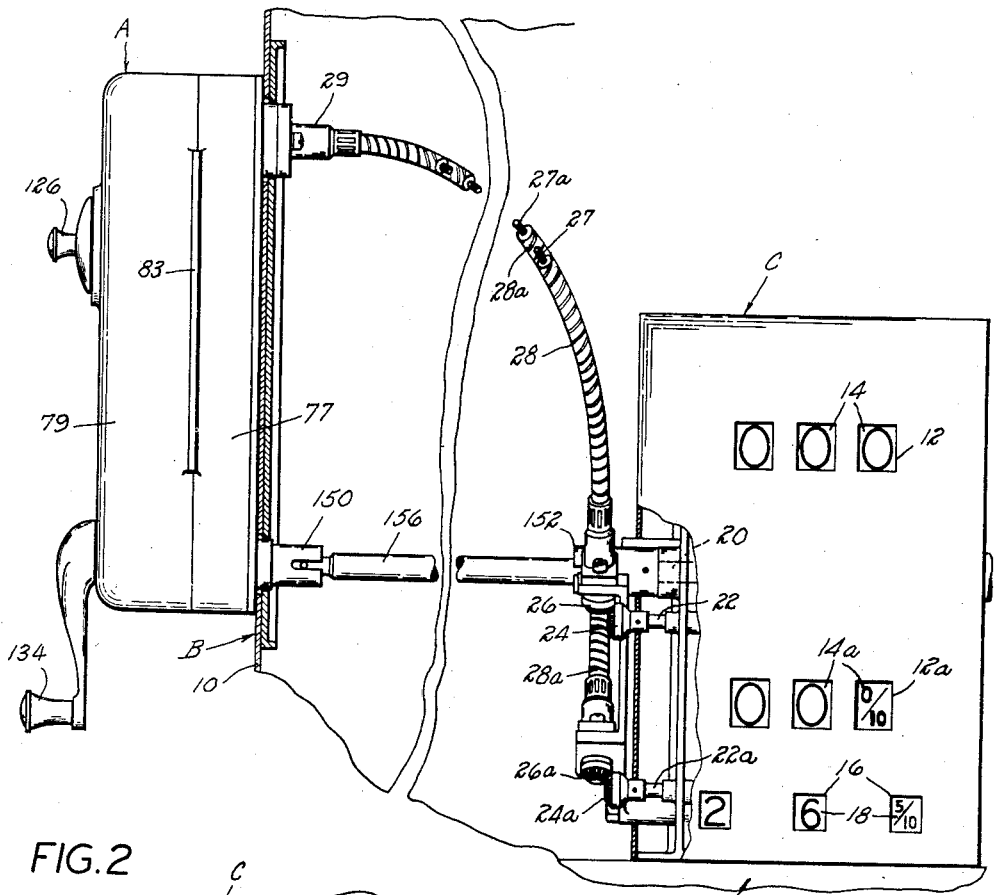
Figure 1 is a side view of a recorder constructed in accordance with the invention and shown attached to the housing of a gasoline dispensing mechanism, the front portion of the dispenser housing being removed to reveal the several connections between the recording device and the register of the dispensing mechanism.
Figure 2:
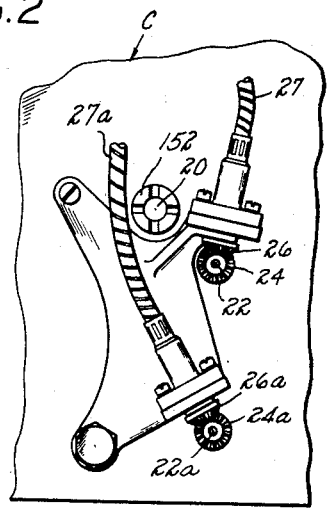
Fig. 2 is a fragmentary side view showing more clearly the register end of the connections between the recording device and the register.

Referring in detail to the drawings, especially Figure 1 thereof, the recording device has been given the reference letter A and the gasoline dispensing mechanism to which the recording device is attached bears the letter B, the dispensing mechanism including a housing 10. Within the housing 10 is a register C for registering the cost and quantity of the gasoline dispensed, and also within the same housing is a speed change mechanism or variator D connected to a meter (not shown) which drives the variator and register in accordance with the amount of gasoline dispensed.

The register C is of conventional construction and includes windows 12, 12a, the windows 12 being employed to reveal number wheels 14 which indicate the cost of the gasoline dispensed during a given transaction and the windows 12a exposing to view in a similar manner number wheels 14a which show the amount of gasoline which has been dispensed during the same transaction. Reading from left to right in Figure 1, the three wheels 14 represent "dollars," "ten cents" and "cents," respectively, each wheel carrying numerals ranging from "0" to "9." The wheels 14a, which indicate the quantity dispensed, bear similar indicia, but representing gallonage in "tens," "units" and "tenths." Additional windows 16 are employed to render visible a still further set of number wheels 18 which are manually adjusted in conjunction with the variator to indicate the price per gallon of the gasoline and remain set until the price is to be changed. Driven in unison with the first order wheels of the cost and quantity wheels 14, 14a is a pair of shafts 22, 22a, these being utilized to operate totalizer wheels (not illustrated) which are not resettable, but are cumulative in their action to register the total money that should have been received by the service station attendant and also the total amount of gasoline that has been dispensed for the various individual transactions during any given period. As explained more fully hereinafter, it is proposed to drive the recorder of the present invention directly from the shafts 22, 22a. For a more detailed description of the register C, if desired, reference may be had, for example, to United States Patent No. 2,264,557, granted on December 2, 1951, to Edward A. Slye in which patent such a mechanism is fully explained.

In order to provide a drive between the register and the recorder A, a pair of bevelled gears 24, 24a is attached to the shafts 22, 22a, these bevelled gears in turn meshing with similar bevelled gears 26, 26a affixed to the end of two flexible shafts 27, 27a leading to the recording device A and contained within flexible sheaths 28, 28a. By utilizing the flexible shafts, it will be recognized that the recording device A may be attached to the housing 10 without concern as to any alignment of the drive shafts of the recording device with respect to the shafts 22 and 22a, and it also becomes a simple matter to by-pass any obstructions, such as framework, etc., which might be present in the particular dispenser.

Figure 7:
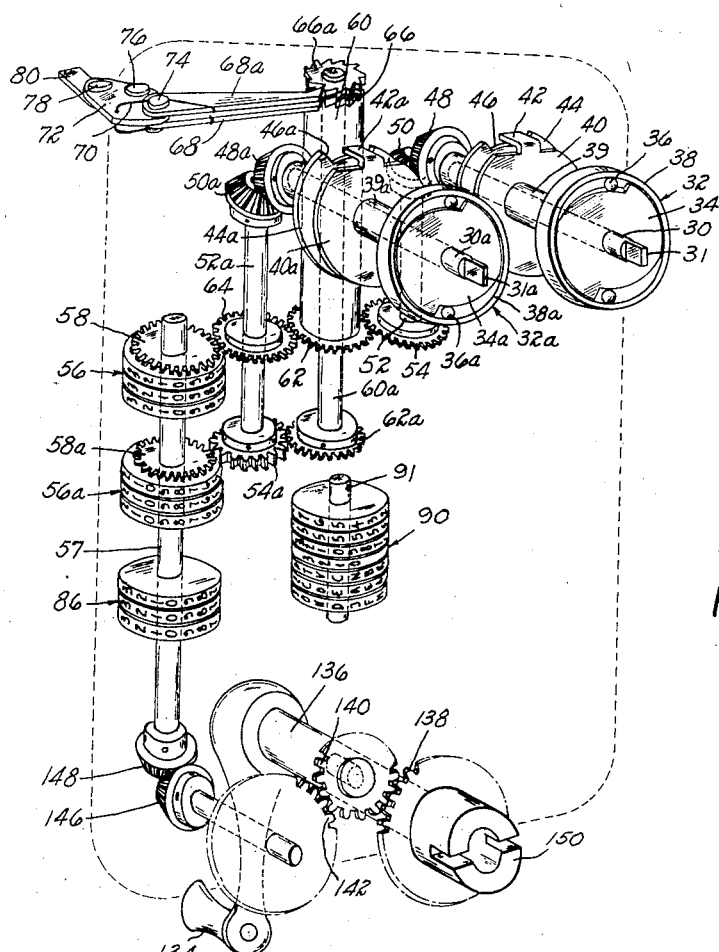
Fig. 7 is a diagrammatic view in perspective showing the general arrangement of the principal parts comprising the recording device.

Coming now to a detailed description of the recording device A, and particularly that portion shown in Figure 7, there is provided a pair of horizontal drive shafts 30, 30a having tongues 31, 31a at their outer ends to which are attached couplings 29, on the ends of flexible shafts 28, 28a referred to in the preceding paragraph. Mounted on the shafts 30, 30a is a pair of conventional one-way drive ball clutches 32, 32a, these clutches including hub or ball carrier portions 34, 34a affixed to the shafts 30, 30a. The carrier portions are configured so as to transmit motion through a pair of balls 36, 36a, to the cups 38, 38a which encircle the hub or ball carriers when the shafts 30, 30a are rotated in a clockwise direction as viewed in Figure 7. At the same time the cups 38, 38a may be independently rotated in the same direction ahead of the shafts 30, 30a without transmitting motion to the shafts. The cups 38, 38a are secured by hubs 39, 39a to a pair of drive plates 40, 40a, all of which are freely rotatable on shafts 30, 30a. Each of the drive plates 40, 40a is equipped with an axially-directed finger 42, 42a which fingers are received in notches 46, 46a provided in the driven plates 44, 44a. The particular width of the fingers 42, 42a is of concern only from a relative standpoint, it being necessary in the present arrangement to have the notches of such an arcuate length relative to the fingers 42 and 42a that there will be a predetermined angle through which the drive plates may be moved relative to the driven plates before the fingers 42, 42a engage the ends of the notches 46, 46a. In the present specific embodiment, this angle is 18 degrees, as will be explained more fully hereinafter.

The driven plates 44, 44a are connected directly to bevelled gears 48, 48a, which are similarly freely rotatable on shafts 30, 30a. Meshed with the bevelled gears 48, 48a are similar bevelled gears 50, 50a which are mounted on and fixed to the upper ends of shafts 52, 52a extending at right angles to shafts 30, 30a. The opposite ends of these shafts 52, 52a carry for rotation therewith a pair of spur gears 54, 54a.

For the purpose of printing the sales slips, which are to be records of any given transaction, there are employed two groups of printing wheels, 56, 56a, these printing wheels loosely encircling a reset shaft 57, and each having printing indicia thereon in the form of ten digits extending from "0" to "9." The values represented by the printing wheels 56, 56a correspond to the register wheels 14, 14a, respectively. Carried by the lowest order wheel of each group and rotatable therewith is a driven gear 58, 58a. The manner in which the gears 58, 58a are driven will presently be described. However, at this point, it should be mentioned that there are three number wheels in each of the groups 56 and 56a selected for illustration. The first number wheel of each group is, of course, rotated by reason of the attached gears 58, 58a. Each succeeding number wheel is rotated one-tenth of a revolution for each full revolution of the preceding wheel by a conventional transfer arrangement, the transfer mechanism consisting primarily of mutilated pinions 55, 55a (see Figure 5) which are turned during a transfer operation by the two-tooth driving gears 59, 59a fixed to each of the lower wheels and which are in mesh with the driven gears 61, 61a of the higher order wheel so as to impart one-tenth of a revolution to the higher order wheel for each full revolution of the lower order wheel.

Describing the intermediate gearing for driving the cost group of printing wheels 56, it is to be observed that a sleeve 60 is disposed for free rotation on a shaft 60a extending between and parallel to the shafts 52, 52a, the rotation of sleeve 60 being effected by means of an integral sleeve gear 62 which is in mesh with gear 54 and also with an idler gear 64 loosely encircling the shaft 52a. The idler gear 64 is in engagement with the gear 58 carried by the first order wheel in the group of wheels labeled 56. Thus, motion is transmitted from the gear 54 via the gears 62 and 64 to said gear 58. Referring to the gallonage group of printing wheels 56a, the gear 54a is in mesh with the gear 58a on the first order wheel of the group 56a, and in this way motion is transmitted from the shaft 52a directly to the gear 58a. Also meshing with the gear 54a is a gear 62a fixed to the end of shaft 60a extending through the sleeve 60 as previously described.

As previously mentioned, the drive shafts 30 and 30a are coupled by the flexible shafts to the totalizer shafts of the register which in present models will turn one-tenth revolution or 36 degrees for the smallest unit being registered which in the case of the cost wheels is one cent and in the case of the gallonage wheels is one-tenth gallon. Accordingly, the specific embodiment of the invention shown in the drawings is designed for operation where the drive shafts 30 and 30a are driven at the rates specified.

At the initiation of a dispensing operation, the fingers 42, 42a are disposed at the lefthand end of the notches 46, 46a in the driven plates 44, 44a and in the specific embodiment these notches will permit a free movement of the fingers and hence the shafts 30, 30a of 18 degrees, i. e. one-half of the smallest unit being registered or recorded. Accordingly, when the dispensing operation is initiated, the shafts 30 and 30a will turn through an angle of 18 degrees before any turning movement is imparted to the driven plates 44, 44a and from thence through the intermediate gearing previously described to the driven gears 58, 58a of the printing wheels of lowest order. All of the intermediate gearing is in a 1:1 ratio so that the amount of turning of the driven plates 44, 44a will correspond exactly with the amount of turning of the printing wheels of lowest order. After the drive shafts 30 and 30a have been turned through an angle of 18 degrees sufficient to pick up the driven plates 44, 44a, then the printing wheels of lowest order and the drive shafts will be driven in unison with the drive shafts 30, 30a, respectively, the only effect of the lost motion connection afforded between fingers 42, 42a and the notches 46, 46a being that the printing wheels will lag by one-half unit behind the exact amount and cost of the liquid actually dispensed and as indicated on the register C.

As will be appreciated, a dispensing operation may be terminated at a time when the printing wheels of the lowest order are at a point of movement where the indicia thereon are not in proper printing position, and, in order to print from such wheels, the wheels will have to be turned to bring the wheels into such proper printing position. The aligning of the printing wheels becomes even more necessary in the event the printing wheels are stopped during a transfer movement with one or more of the printing wheels of higher order also positioned with its indicia displaced from proper printing position.

In order to align the various order wheels of each of the groups 56, 56a, as a preliminary to a printing operation, there is provided a pair of side-by-side ratchet wheels 66, 66a, the ratchet wheel 66 being fixed to the upper end of the sleeve 60 and the similar ratchet wheel 66a being carried by and fixed to the upper end of the shaft 60a. As will be apparent, both of these ratchet wheels are turned when the sleeve 60 and the shaft 60a are rotated by gears 62 and 62a, respectively. Because the ratchet wheels 66, 66a are intended to align, respectively, the cost wheels 56 and the quantity wheels 56a, each is equipped with ten ratchet teeth spaced 36° apart so that each ratchet tooth corresponds to one of the ten digits carried by the first order wheels of the two groups 56, 56a. Since the sleeve 60 and shaft 60a are geared to the driven gears 58, 58a of the number wheels of lowest order, it will be apparent that the angular position of ratchet wheels 60, 60a will determine the rotated position of the number wheels and hence their alignment. The ratchet wheels 66, 66a cooperate with a pair of pawls 68, 68a which are biased into engagement with the ratchet wheels 66, 66a by means of a spring 70, the pawls being pivotally mounted to a lever plate 72 by means of a pin 74. Also carried by the lever plate 72 is a pin 76 which connects the lever plate to a frame member or supporting plate 73 extending centrally of the housing, a third pin 78 pivotally supporting an actuating lever 80 which is engageable by mechanism hereinafter referred to.

Figure 6:
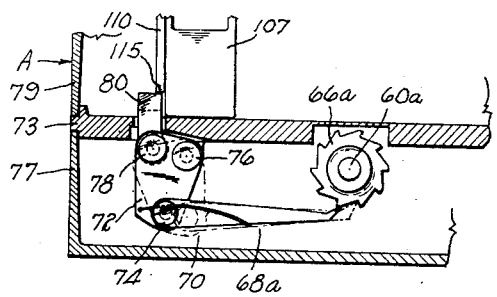
Fig. 6 is a fragmentary section taken in the direction of line 6—6 of Fig. 5.

The movement of the pawls 68, 68a in response to pivoting movement of the lever plate 72 is slightly less than the distance between the teeth of the ratchet wheels 66, 66a. As a specific example, a thrust equal to approximately 32° has been found to be desirable. The thrust of the pawls 68, 68a in response to pivoting of plate 72 and hence the position to which the pawls 68, 68a will turn the ratchet wheels 66, 66a is calibrated to coincide exactly with the alignment of the indicia of the printing wheels in proper printing position. The normal position of the lever plate 72, i. e. the position of the plate at all times except during an aligning operation is shown in solid lines in Figure 6 of the drawings, while the actuated or aligning position is shown in dotted lines. The position of the ratchet wheel shown in Figure 6 coincides with that when the number wheels are in properly aligned printing position. It thus will be seen that if the printing wheels of lowest order happen to be in properly aligned position when the pawls 68, 68a are actuated, the pawls will merely ride on the teeth of the ratchet wheels from the position shown in solid lines in Figure 6 to the dotted line position without causing the printing wheels to advance. However, if the printing wheels are not in properly aligned position, the pawls 68, 68a will engage a tooth of the ratchet wheels to advance the ratchet wheels to complete the movement of the printing wheels to the next digit. Since the printing wheels lag by half a unit, it is proper to advance them to the next full integer at the end of the delivery resulting in a charge which in whole numbers comes closest to the actual cost or quantity delivered. Advancement of the printing wheels to aligned printing position through the drive gearing is permitted despite the fact that shafts 30, 30a remain stationary by virtue of the lost-motion connection between plates 44, 44a and 40, 40a and also, depending upon the extent of the advancing movement, by the one-way drive ball clutches.

In order to reset the recorder prior to a subsequent dispensing operation, there is provided a handle 134 mounted on a shaft 136 extending through the housing of the recorder. The shaft 136 carries a gear 138 which drives an idler gear 140 which in turn meshes with a gear 142. The gear 142 is fixed to a beveled gear 146 which in turn meshes with a bevelled gear 148 fixed to the end of the reset shaft 57, previously referred to as extending through and supporting the printing wheels.

The inner end of the shaft 136 is provided with a coupling 150 for receiving a connecting rod 156 which is inserted at its other end in a coupling 152 on the outer end of the register reset shaft 20. It thus will be seen that, when the handle 134 is turned, there is caused simultaneous resetting of the recorder and the register, thus insuring that the readings of these two devices will be maintained alike.

As previously mentioned, the specific embodiment of the recorder shown in the drawings is one specifically designed for use with a register of the type shown in the Slye Patent No. 2,264,557. In order to reset standard registers of this type, it is necessary to turn the reset shaft through one complete turn plus forty-five degrees or, in other words, one and one-eighth turn. After the reset shaft is turned through one and one-eighth turn, further turning movement of the reset shaft is prevented and then when the same is released, the reset shaft is turned backwardly 45 degrees. One of the purposes for requiring one and one-eighth turn of the reset shaft is to insure that all of the wheels will be picked up and be brought back to zero position. It is, therefore, contemplated in accordance with the present invention that the handle 134 will be turned through one and one-eighth turn during a resetting operation and then will be turned back through an angle of 45 degrees or one-eighth turn. Inasmuch as the mechanism for insuring the described movement of the reset handle is contained in the register, it is unnecessary to duplicate the same in the recorder. In the event the register were not provided with such automatic means, then, of course, it would be within the contemplation of the invention to include such automatic means within the recorder itself. In any event, even in the absence of such automatic means, either in the register or the recorder, the operator could manually turn the handle in a reverse direction after first turning the handle in a direction to cause resetting.

During the one and one-eighth turn of the handle 134 and hence the shaft 136, similar turning movement is imparted to the reset shaft 57 which causes the printing wheels to be returned to zero position. In the interests of simplicity and clarity of presentation, the manner in which the reset shaft advances the printing wheels to zero has been omitted since this is a matter of standard construction. In brief, the reset shaft 57 is provided with a longitudinal groove which will pick up the individual reset pawls of the printing wheels and thus return the wheels to zero position, all as shown, for example, in the aforementioned Slye Patent No. 2,264,557.

Since the printing wheels of lowest order are affixed to the gears 58 and 58a, the resetting movement of these printing wheels will be imparted through the gearing previously described to the driven plates 44, 44a thus advancing them a minimum of forty-five degrees, this being the minimum amount of turning imparted to the number wheels of lowest order during a resetting operation. The advance of the driven plates 44, 44a through a minimum angle of forty-five degrees insures that at the end of reset the fingers 42 will be engaged against the lefthand edge of the notches 46, 46a as viewed in the drawings. Since the free movement or lost motion between driven plates 44, 44a and driving plates 40, 40a is only 18 degrees, some forward motion also will be imparted to the plates 40, 40a, this forward movement being permitted, of course, by the one-way drive clutches 34, 34a, even though the drive shafts 30 and 30a remain stationary.

Figure 4:
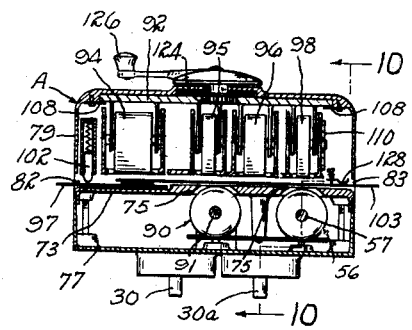
Fig. 4 is a cross-sectional view taken along the line 4—4 of Fig. 3.

The shafts 57, 52 and 60a are journaled in projections in the rear of the frame member or supporting plate 73, the plate 73 being provided with openings such as the opening 75 shown in Figure 4 registering with the printing wheels to permit them to be used for printing upon a manifold form disposed upon the opposite face of the plate 73. The mechanism so far described is encased in a cup-shaped housing 77 which is fastened in any suitable manner to the gasoline dispenser housing 10.

In addition to the printing wheels 56 and 56a, previously referred to, there also is provided on shaft 57 a set of printing wheels 86 for recording the price per gallon of the gasoline being dispensed. The printing wheels 86 are freely rotatable on the shaft 57 and are held in selected position by spring fingers 87. There also is provided a set of printing wheels 90 disposed on a separate shaft 91 which are similarly held in selected position by spring fingers 93 for recording the date of the transaction. It is contemplated that the operator or attendant will manually set the printing wheels 86 and 90 as required and that these printing wheels will remain in such position until again changed by the operator or attendant.

Since it probably will be desired to also print additional information such as the type of gasoline dispensed and the name and address of the gasoline station, space is provided on the plate 73 for small embossed printing plates 85 and 88 shown in phantom outline in Figure 5 of the drawings. In the specific embodiment shown in the drawings, the plate 85 is intended to be provided with an embossing denoting the name and location of the station, while plate 88 is intended to bear a suitable legend such as "Hi-Test Gas."

The printing mechanism of the recorder is contained in a removable cup-shaped cover plate 79, which plate is held in place during normal use of the device by a suitable lock 81. The cover plate 79 is removable for purposes of adjustment of the mechanism or for the manual setting of the printing wheels 86 and 90, or for replacement of the plates 85 and 88. The cover plate is cut away on each side edge as indicated at 82 and 83 to provide openings or slots through which may be inserted the "Charga-Plate" of the customer and the manifold form on which the bill or receipt is to be printed. As best indicated in Figure 4 of the drawings, the "Charga-Plate" 97 may be inserted through the slot 82 so as to be received in a depression 99 in the plate 73. The "Charga-Plate" is held in inserted position by means of a pair of guide plates 101 and a spring-pressed detent 102. The location of the manifold form 103 after insertion through the slot 83 is also best shown in Figures 4 and 8.

Figure 10:
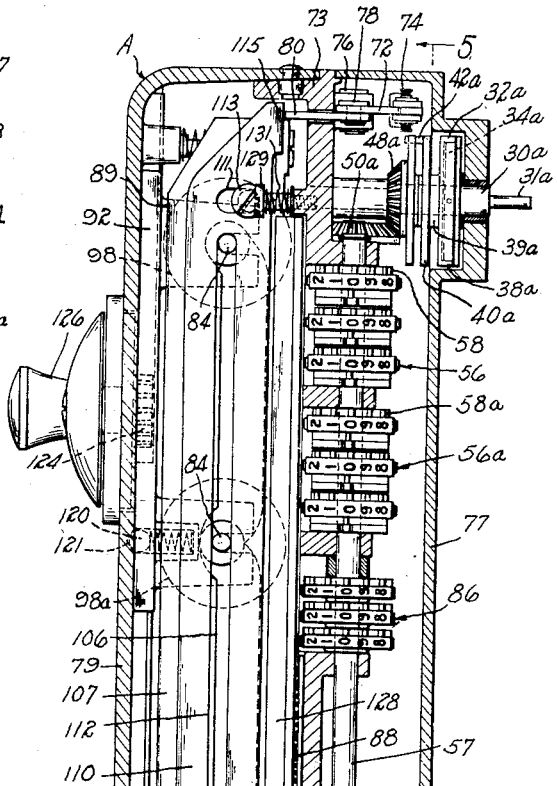
Fig. 10 is an enlarged cross-sectional view taken along the line 10—10 of Fig. 4.

Disposed adjacent the slot 83 in which the manifold form 103 is inserted into the device is a retainer plate 128 as best shown in Figures 4 and 10 and which is mounted on the plate 73 by means of springs 129 disposed about screws 131. The function of the retainer plate 128 is to retain the manifold form in inserted position and to hold in such position until the printing operation is completed.

Figure 9:
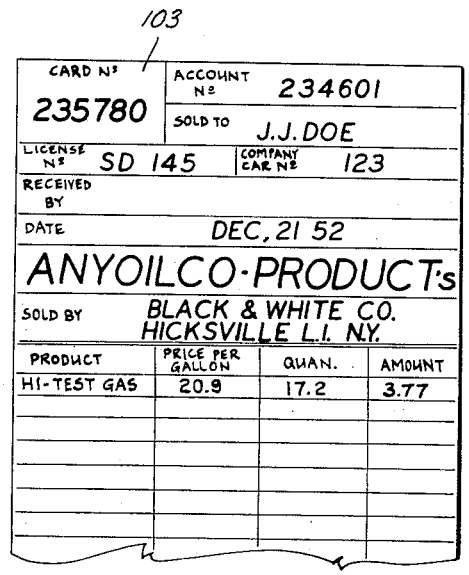
Fig. 9 is a fragmentary plan view of a sales ticket after a printing operation.

While a variety of bill or receipt forms might be used in accordance with the invention, a preferred type of manifold form 103 which is shown in plan view in Figure 9 of the drawings is preferably composed of a plurality of pages having facing sheets of carbon paper. This type of manifold form is well known in the art and permits the printing on the form merely by pressure upon the printing plates or printing wheels without any need for inking ribbons or the like. As shown in the drawings, the form is designed to have recorded thereon the data identifying the purchaser, the date of the transaction, the name and location of the station, and finally the type of gas, price per gallon, the quantity dispensed and the total cost.

Figure 3:
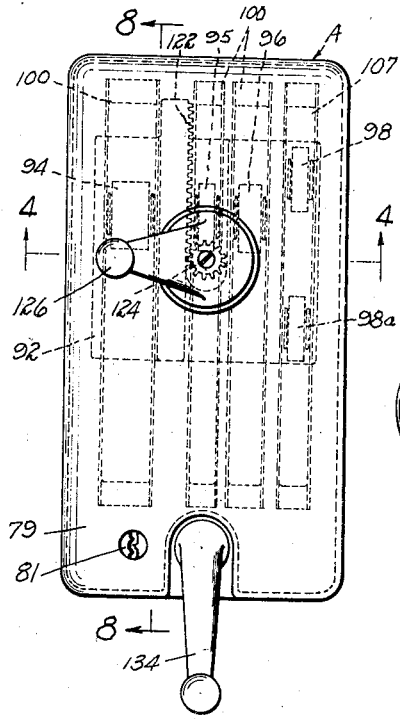
Fig. 3 is a front elevational view of the recording device.

In order to print on the manifold form, there is provided a plurality of individually suspended pressure rollers, these rollers being disposed as best shown in Figures 3, 4, 8 and 10 of the drawings, and being actuated by a carrier 92. The first roll 94, indicated at the lefthand side of Figures 3 and 4, is a relatively wide roll adapted to press the manifold form against the customer "Charga-Plate." The second roll 95, which is relatively narrow, is adapted to press the manifold form against the printing wheels 90 which, as previously described, are set to print the particular date of the transaction. The third roll 96 is adapted to press the manifold form against the printing plate 85 which contains the indicia denoting the name and address of the service station. At the righthand side, as viewed in Figures 3 and 4, are a pair of rollers 98 and 98a, the upper roller 98 being adapted primarily to press the manifold form against the printing wheels 56 and 56a denoting the cost and gallonage dispensed, while the roller 98a primarily cooperates with the printing wheels 86 which are the wheels which are set to denote the price per gallon, and the printing plate 88 bearing the indicia "Hi-Test Gas." A pair of rollers 98, 98a is used instead of a single roller because of the length of the line which is to be printed so as to decrease the distance through which the carrier 92 must be moved in order to complete a printing operation. The use of individual rollers for each line of printing insures that good contact will be made between the manifold form and the printing indicia and also because less force is required than when a single pressure element of the plate type, for example, is used. Referring to Figure 9 of the drawings, it will be seen that the manifold form after printing includes the indicia from the "Charga-Plate" at the top of the form, the date printed by the printing wheels 90 follows in a lower line, and beneath the name of the oil company which is printed on the form as furnished, there is printed the name and location of the gas station as furnished by the printing plate 85. Beneath that, in a single line, is printed the legend "Hi-Test Gas" as furnished by the printing plate 88, followed by the price per gallon provided by the printing wheels 86, the quantity of gasoline dispensed taken from the printing wheels 56a, and the amount of the transaction taken from the printing wheels 56.

Figure 8:
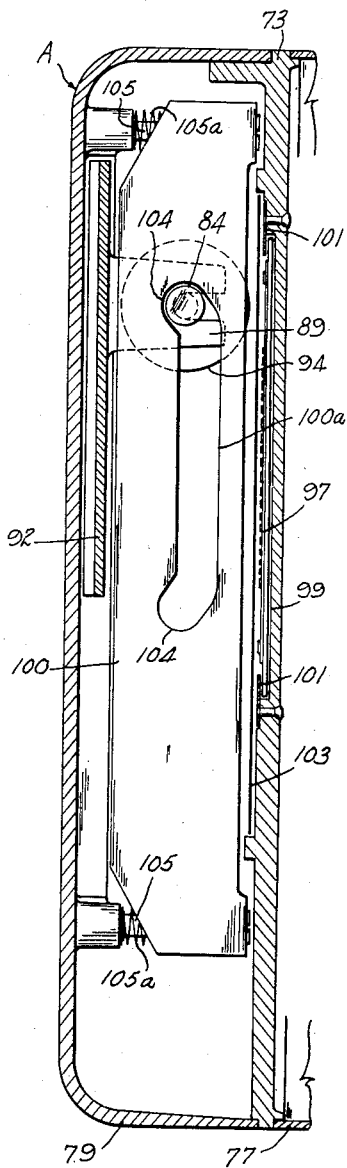
Fig. 8 is a fragmentary cross-sectional view taken along the line 8—8 of Fig. 3.

Each of the rollers 94, 95, 96, 98 and 98a is rotatably mounted on a shaft 84, the shaft 84 being received in slotted journals 89 extending from the carrier 92. The ends of the roller shafts 84 on which are supported the rollers 96, 95 and 94 are received in a series of roller guides or yokes 100 which are formed as best shown in Figure 8 of the drawings. The guides or yokes 100 comprise an elongated plate having a slot 100a in which are received the ends of the roller shafts 84, the slots 100a being formed with upwardly curved ends as indicated at 104. As a result of the movement of the carrier 92 and the engagement of the ends of the roller shafts 84 in the slots 100a, the rollers are first pressed downwardly into engagement with the manifold so as to press it against the printing indicia, and then at the end of the travel the rollers are again moved away from the printing elements to permit the manifold to be removed. The guides or yokes 100 are supported at their ends by the heads of adjustable screws 105 and are biased inwardly toward the supporting plates 73 by springs 105a disposed about the shanks of the screws 105. By reason of the resilient mounting of the yokes or guides 100, the machine is adapted to accommodate manifold packs of various thicknesses and at the same time provide a predetermined pressure by means of the springs 105a.

The roller shafts 84 supporting the rollers 98, 98a are engaged in slots 106 of the roller guides 107 which are best shown in Figure 10. The slots 106, in effect, are two slots similar to the slots 100a and situated end to end so as to accommodate the roller shafts of the double rollers 98, 98a in tandem.

Figure 11:
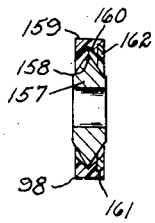
Fig. 11 is a cross-sectional view of one of the printing rollers.

The printing rollers 94, 95 and 96 are preferably made in the form of a simple, inexpensive, one-piece annular type roll as shown in side view in Figure 8 and preferably are made of a tough resilient material, such as nylon. The roller 98a also is preferably formed in this same manner. The roller 98, however, is preferably constructed in the form shown in Figure 11 of the drawings. Referring to Figure 11, it will be seen that roller 98 comprises an annular brass hub 157 having a peripheral ridge 158 which is triangular in cross section. Encircling the hub 157 is a nylon ring 159 having an internal annular groove 160 which likewise is triangular in cross section although slightly more flared than the ridge 158. The inner diameter of the nylon ring is made substantially greater than the outer diameter of the hub 157 so as to produce a loose fit between the ring and hub permitting the ring to wobble on the hub, although not loose enough to fall off. For ease of assembly, one side of the nylon ring 159 is grooved as indicated at 161 which provides enough clearance to permit the ring 159 to be slipped onto the hub 157 and into which can be pressed an annular brass ring 162 to hold the roller in assembled position.

The reason for constructing the roller 98 in the manner shown in Figure 11 is that, when printing from number wheels, some difficulty is experienced in obtaining a good print in the event any of the wheels are even slightly turned from perfectly aligned printing condition. Such slight deviation from proper aligned position can easily occur because there is always some free play in the gears no matter how accurately constructed. For good printing, the indicia on the printing wheels preferably are flat rather than arcuate, and therefore, if the printing wheels are turned even to a very slight degree, one end of the indicia will be higher than the other which difference of elevation, even though small in amount, may produce a poor print with conventional printing rollers. When the printing roller is constructed as shown in Figure 11, the annular ring 159 will tilt or wobble on the hub 157 as the roller is moved transversely across the printing wheels thus accommodating the same to any slight cocking of the printing indicia and thus assuring that a good print will be obtained.

The carrier 92 which actuates the rollers is slidably mounted in the cover 79 and retained thereon by guide strips 108. A spring-pressed ball detent 120 on the carrier is adapted to engage in notches 121 at the respective ends of the travel of the carrier and thus hold the same in the "at rest" position. The carrier is provided with a rack 122 which is engaged by a pinion 124 connected to a crank handle 126, disposed on the outside of the housing 79 where it may be turned by the operator. The size of the pinion 124 is such that the handle 126 is turned through one and one-half turns in order to move the carrier from extreme upper to lower position, and vice versa, with the result that the handle will always be turned to a horizontal position at the end of a printing operation and the direction of turning for a subsequent printing operation will always be in a downward direction. To explain this more fully, it will be observed that in Figure 3 the handle 126 is horizontal and pointing in a lefthand position and the carrier is in the upper position shown in dotted lines in such figure. In order to perform a printing operation, the operator will turn the handle 126 through one and one-half turns in a counterclockwise direction as viewed in Figure 3 whereupon the handle will be in a horizontal position but pointing in the opposite direction. To perform a subsequent printing operation, the operator will turn the handle in a clockwise direction. Thus, in any printing operation, the movement of handle 126 will be begun by a downward thrust on the handle 126, an operation which is easy for the operator to remember and which, if properly performed, will avoid unnecessary strain on the mechanism.

The ends of the shafts 84 which carry the rollers 98 are also engaged in a slot 112 of a plate 110, the plate 110 being provided with elongated openings 111 through which are received the screws 113. The upper end of the plate 110, as viewed in Figure 10 of the drawings, is provided with a projection 115 which rests against the actuating lever 80 for aligning the printing wheels, this engagement being best shown in Figure 6 of the drawings. As will be apparent, when a printing operation is initiated, as soon as there is a movement of the rollers and roller shafts toward the plate 73, the movement of the shafts 84 carrying the rollers 98, 98a will cause a similar movement of the plate 110 sufficient to move the pawls 68 and 68a to align the printing wheels 56 and 56a. It thus is assured that the alignment of the printing wheels will always occur at the outset of each printing operation.

It thus will be seen that there has been provided in accordance with the invention, a recorder of simple and rugged construction adapted for use with auxiliary apparatus which is foolproof and easy to operate, which will produce an accurate and legible record, and which will function efficiently and effectively for the intended purpose.

As many changes could be made in the above constrution and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim:

1. In a recorder for use with an associated mechanism, the combination comprising a set of printing wheels including a wheel of lowest order, means for driving the wheel of lowest order from an associated mechanism including a lost motion connection for driving the wheel in retard of the associated mechanism, and means independent of the associated mechanism for advancing said printing wheels to align the indicia thereon prior to printing.

2. The combination described in claim 1 wherein the means for advancing said printing wheels has a maximum movement not exceeding approximately twice the lost motion of said lost motion connection.

3. In a recorder for use with an associated mechanism, the combination comprising a set of printing wheels including a wheel of lowest order having spaced indicia about its periphery, means for driving the wheel of lowest order from an associated mechanism including a lost motion connection having a lost motion sufficient to retard movement of the wheel of lowest order through half the angular distance between consecutive indicia, and means independent of the associated mechanism for advancing said wheel of lowest order to move the next consecutive indicia to printing position.

4. In a recorder of the character described, the combination comprising a set of printing wheels including a wheel of lowest order, driving means connectable to an associated mechanism, a drive train connected to the wheel of lowest order, a lost motion connection between the driving means and the drive train to cause the wheel to move in retard of the associated mechanism, and means independent of the associated mechanism connected to said drive train for advancing the wheel of lowest order to aligned position prior to a printing operation.

5. In a recorder of the character described, the combination comprising a set of printing wheels including a wheel of lowest order having spaced printing indicia thereon, driving means connectable to an associated mechanism, a drive train connected to the wheel of lowest order, a lost motion connection between the driving means and the drive train to cause the wheel to move in retard of the associated mechanism, a ratchet wheel connected to the drive train having a series of shoulders corresponding to the indicia on said wheel of lowest order, and means independent of the associated apparatus for advancing the ratchet wheel to move the shoulders thereof to a predetermined angular position.

6. The combination described in claim 5 wherein the lost motion of said lost motion connection is equal to approximately one-half the turning movement of said ratchet wheel through the angular distance between consecutive shoulders.

7. In a recorder of the character described, the combination comprising a set of printing wheels including a wheel of lowest order, driving means connectable to an associated mechanism, means connecting the driving means to the wheel of lowest order including a pin and slot lost motion connection for delaying actuation of the number wheel by said driving means and permitting said number wheel to be advanced relative to the driving means when the driving means is at rest, and means for advancing the number wheel independently of said driving means.

8. In a recorder of the character described, the combination comprising a set of printing wheels including a wheel of lowest order, driving means connectable to an associated mechanism, a lost motion connection between the driving means and the wheel of lowest order to cause the wheel to move in retard of the associated mechanism, printing means for obtaining a print from said printing wheels, means for advancing the number wheels to aligned position, and means associated with the printing means for operating the last-named means prior to a printing operation.

9. In a recorder of the character described, the combination comprising a set of printing wheels including a wheel of lowest order, driving means connectable to an associated mechanism, a lost motion connection between the driving means and the wheel of lowest order to cause the wheel to move in retard of the associated mechanism, printing means for obtaining a print from said printing wheels, and means responsive to movement of said printing means for advancing the wheel of lowest order to aligned printing position.

10. In a recorder of the character described, the combination comprising a set of printing wheels including a wheel of lowest order, driving means connectable to an associated apparatus, a drive train between the wheel of lowest order and the driving means including a lost motion connection to cause the wheel to move in retard of the associated mechanism, a ratchet wheel operatively connected to the wheel of lowest order, a pawl engageable with said ratchet wheel to rotate the same to a predetermined angular position for aligning the printing wheels in proper printing position, and printing means for obtaining a print from said printing wheels including means for actuating said pawl.

11. In a recorder for connection to a register of the type having a first rotatable shaft for resetting the register to zero and a second shaft rotated in response to the number of units registered, the combination comprising a plurality of wheels having numerical printing indicia thereon, gear means for advancing said wheels, a ratchet wheel rotatable with said gear means, said ratchet wheel being provided with a number of teeth corresponding to the number of digits on the lowest order wheel, a pawl member engageable with said ratchet wheel and movable through a distance slightly less than the spacing between ratchet teeth thereby to insure that said first printing wheel will be disposed in a preferred angular position each time the pawl member is fully actuated, and clutch means drivingly connected to said gear means and adapted to be connected to said second shaft of the register, said clutch means including means providing an angular lag between said second shaft and said lowest order printing wheel during rotation equal to one-half digit on said lowest order wheel.

12. In a recorder for connection to a register of the type having a first rotatable shaft for resetting the register to zero and a second shaft rotated in response to the number of units registered, the combination comprising a rotatable reset shaft connectable to the first shaft of the register, a plurality of numerical printing wheels in side-by-side relationship mounted for rotation on said shaft, gear means for advancing said wheels, a ratchet wheel rotatable with said gear means, said ratchet wheel being provided with a number of teeth corresponding to the number of digits on the lowest order printing wheel, a pawl member engageable with said ratchet wheel and movable through a distance slightly less than the spacing between ratchet teeth thereby to insure that said lowest order wheel is left in a preferred angular position each time the pawl member is fully actuated, a driven member connected to said gear means for rotating same, a driving member mounted for relative rotation with respect to said driven member, means operatively associated with said driven and driving members for limiting relative rotation thereof to an angular amount corresponding to one-half digit on said lowest order wheel, and a one-way clutch unit connected to said driving member and adapted to be connected to said second register shaft to permit advancement of said driving member relative to the second shaft.

13. In a recorder for connection to a register of the type having a first rotatable shaft for resetting the register to zero and a second shaft rotated in response to the number of units registered, the combination comprising a rotatable reset shaft connectable to the first shaft of the register, a plurality of numerical printing wheels in side-by-side relationship mounted for rotation on said shaft, gear means for advancing said wheels, a ratchet wheel rotatable with said gear means, said ratchet wheel being provided with a number of teeth corresponding to the number of digits on the lowest order printing wheel, a pawl member engageable with said ratchet wheel and movable through a distance slightly less than the spacing between ratchet teeth thereby to insure that said lowest order wheel is disposed a preferred angular position, platen means mounted for movement relative to the printing wheels, means carried by said platen means for actuating said pawl member, a driven member connected to said gear means for rotating same, a driving member mounted for relative rotation with respect to said driven member, means operatively associated with said driven and driving members for limiting relative rotation thereof to an angular amount corresponding to one-half digit on said lowest order wheel, and a one-way clutch unit connected to said driving member and adapted to be connected to said register shaft to permit advancement of said driving member relative to the second shaft.

14. In a recorder for connection to a register of the type having a first rotatable shaft for resetting the register to zero and a second shaft rotated in response to the number of units registered, the combination comprising a rotatable reset shaft connectable to the first shaft of the register, a plurality of numerical printing wheels in side-by-side relationship mounted for rotation on said shaft, gear means for advancing said wheels, a ratchet wheel rotatable with said gear means, said ratchet wheel being provided with a number of teeth corresponding to the number of digits on the lowest order printing wheel, a pawl member engageable with said ratchet wheel and movable through a distance slightly less than the spacing between ratchet teeth thereby to insure that said lowest order wheel is disposed in a preferred angular position, a printing roll carrier movable in a direction parallel to the axis of said reset shaft, a roller having a shaft journaled in said carrier for movement in a direction at right angles to the axis of said reset shaft, guide means for urging said roller shaft toward the printing wheels to effect a printing operation as said carrier is moved, a ratchet driver mounted on said guide means for movement relative thereto in a direction to cause said pawl member to be actuated when said carrier is moved in a direction to effect a printing operation, said ratchet driver being provided with a longitudinal slot in which extends one end of said roller shaft for producing actuating movement of said ratchet driver, a driven member connected to said gear means for rotating same, a driving member mounted for relative rotation with respect to said driven member, means operatively associated with said driven and driving members for limiting relative rotation thereof to an angular amount corresponding to one-half-digit on said lowest order wheel, and a one-way clutch unit connected to said driving member and adapted to be connected to said register shaft to permit advancement of said driving member relative to the second shaft.

15. In a recorder of the character described, the combination comprising a set of printing wheels including a wheel of lowest order, means for driving the wheel of lowest order from an associated mechanism including a lost motion connection to cause the wheel to move in retard of the associated mechanism, means for zeroizing the printing wheels, and means for returning the lost motion connection to original position.

16. In a recorder of the character described, the combination comprising a set of printing wheels including a wheel of lowest order, means for driving the wheel of lowest order from an associated mechanism including a lost motion connection to cause the wheel to move in retard of the associated mechanism, and means for simultaneously zeroizing the printing wheels and returning the lost motion connection to original position.

17. In a recorder of the character described, the combination comprising a set of printing wheels including a wheel of lowest order, a drive gear associated with the wheel of lowest order, means for driving the drive gear from an associated mechanism including a lost motion connection, and resetting means for advancing the printing wheels to zero and for advancing the drive gear to return the lost motion connection to original position.

18. In a recorder of the character described, the combination comprising a set of printing wheels including a wheel of lowest order, resetting means for advancing the wheels to zero position, driving means connectable to an associated mechanism, a drive gear fixed to the wheel of lowest order, and a lost motion connection between the driving means and said drive gear whereby the drive gear will operate in retard during operation of the driving means and the lost motion connection will be turned to starting position upon operation of the resetting means.

19. In a recorder of the character described, the combination comprising a reset shaft, a set of printing wheels rotatably mounted on the reset shaft including a wheel of lowest order having spaced indicia thereon, means on the wheels engageable by the reset shaft for advancing the wheels to zero position when the shaft is rotated in one direction, a drive gear fixed to the wheel of lowest order, driving means connectable to an associated mechanism, a driving connection between the driving means and the said drive gear including means permitting relative free movement between the driving means and drive gear equal to one-half the distance between consecutive indicia on the number wheel of lowest order, and means for reversely rotating the reset shaft at the end of a resetting operation.

20. In a recorder of the character described, the combination comprising a set of printing wheels including a wheel of lowest order having spaced indicia thereon, a drive gear fixed to the wheel of lowest order, driving means connectable to an associated mechanism including a one-way clutch, a lost motion connection between the driving means and said drive gear permitting movement of said drive gear relative to the driving means equal to one-half the distance between consecutive indicia on the number wheel of lowest order, means for advancing the drive gear relative to the driving means to position the number wheel of lowest order in proper printing position, and resetting means for advancing the number wheel into zero position by movement through an angular distance at least as great as the distance between consecutive indicia.

21. In a recorder of the character described, the combination comprising a set of printing wheels including a wheel of lowest order having spaced indicia thereon, a reset shaft for said number wheels rotatable in a wheel advancing direction for one complete turn plus a partial turn not less than one-half the angular distance between consecutive indicia of said wheel of lowest order, said shaft being reversely rotatable for a distance equal to said partial turn at the completion of reset, driving means connectable to an associate mechanism including a one-way clutch, a lost-motion connection between the driving means and the wheel of lowest order having a lost motion equal to one-half the angular distance between consecutive indicia of said wheel of lowest order, and means independent of the associated mechanism and said reset shaft for advancing the number wheel of lowest order to proper printing position through a turning movement not exceeding the angular distance between consecutive indicia of said wheel.

22. In a recorder of the character described, the combination comprising a reset shaft, a set of printing wheels rotatably mounted on said reset shaft including a wheel of lowest order having spaced printing indicia thereon, a drive train including a gear fixed to the wheel of lowest order, driving means connectable to an associated mechanism, a lost motion connection between the driving means and the drive train permitting free movement therebetween equal to one-half the distance between consecutive indicia of the wheel of lowest order, a clutch in said driving means permitting additional advancement of the drive train, a ratchet wheel connected to the drive train, means to advance the ratchet wheel to a predetermined angular position and having a movement slightly less than the distance between consecutive indicia of the wheel of lowest order, and means for turning the reset shaft through an angle of rotation of 360 degrees plus at least one-half the distance between consecutive indicia of the wheel of lowest order.

23. In a recorder of the character described, the combination comprising a set of printing wheels including a wheel of lowest order, driving means connectable to an associated mechanism, a lost motion connection between the driving means and the wheel of lowest order to cause the wheel to move in retard of the associated mechanism, printing means comprising a roller movable transversely across the wheels in sequence, means for actuating the roller, and means responsive to movement of the roller for advancing the wheel of lowest order to aligned printing position with an indicia thereof in alignment with said roller.

24. In a recorder, a set of side-by-side printing wheels having annularly arranged printing indicia thereon, a carriage movable transversely of the wheels, and a platen carried by said carriage for pressing a sheet against the aligned indicia on said wheels in sequence, said platen comprising a shaft extending transversely of the wheel, a hub on the shaft fixed against axial and radial movement, and a roller mounted on the hub for tilting movement relative to the hub.

25. In a recorder, a set of side-by-side printing wheels having annularly arranged printing indicia thereon, a carriage movable transversely of the wheels, and a roller carried by said carriage for pressing a sheet against the aligned indicia on said wheels in sequence comprising a rotatably mounted hub portion having its axis maintained parallel to the axis of the wheels and having an annular ridge and a rim portion having an internal annular groove loosely fitting over said hub dimensioned to prevent axial separation of the rim and hub portion but permitting tilting of the rim relative to the hub portion.

References Cited in the file of this patent

UNITED STATES PATENTS

| | | |
|---|---|---|
| 668,353 | Landfear | Feb. 19, 1901 |
| 1,262,703 | Ross | Apr. 16, 1918 |
| 1,421,920 | De Minico | July 6, 1922 |
| 1,869,022 | Phare | July 26, 1932 |
| 2,040,072 | Brendel | May 12, 1936 |
| 2,043,600 | Ward | June 9, 1936 |
| 2,079,957 | Clifton | May 11, 1937 |
| 2,260,970 | Elder | Oct. 28, 1941 |
| 2,315,828 | Thatcher | Apr. 6, 1943 |
| 2,606,494 | Vogt | Aug. 12, 1952 |